Figure 1:
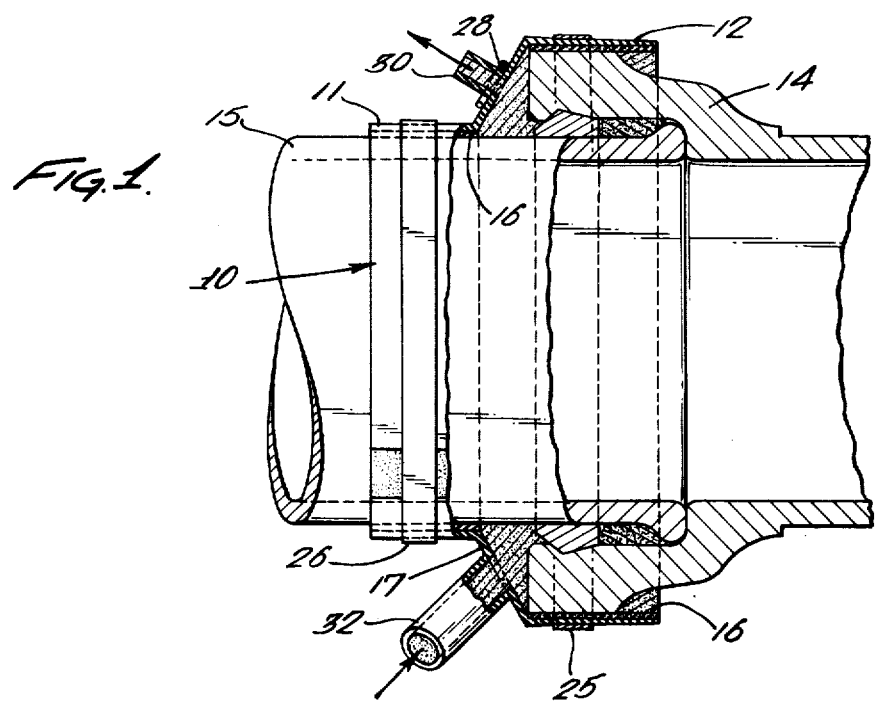

United States Patent [19]

Hilbush

[11] 4,053,176

[45] Oct. 11, 1977

[54] COLLAR FOR SEALING PIPE JOINTS

[75] Inventor: Edward Oscar Hilbush, West Chester, Pa.

[73] Assignee: West Chester Chemical Co., Inc., West Chester, Pa.

[21] Appl. No.: 622,696

[22] Filed: Oct. 15, 1975

[51] Int. Cl.² .......................................... F16L 55/00
[52] U.S. Cl. .................................... 285/15; 285/294; 285/293
[58] Field of Search .......................... 285/15, 294, 293; 138/97, 99; 425/13, 256, 812, DIG. 242; 264/31, 32, 36

[56] References Cited

U.S. PATENT DOCUMENTS

| 3,141,478 | 7/1964 | Copeland | 138/97 |
| 3,368,005 | 2/1968 | Buczula et al. | 138/97 |

FOREIGN PATENT DOCUMENTS

| 188,708 | 11/1922 | United Kingdom | 285/297 |
| 1,166,335 | 10/1969 | United Kingdom | 285/15 |

Primary Examiner—Dave W. Arola
Attorney, Agent, or Firm—Hyde W. Ballard

[57] ABSTRACT

This invention pertains to equipment for sealing pipe joints and particularly a collar for sealing a leaking underground gas main with an absolute minimum of excavation. The procedure as currently practiced for accomplishing this result includes the installation of a rubber collar through a narrow bore hole which can then be clamped to the bell and spigot joint by means of bands. It is then filled with a sealant injected through a suitable inlet in the collar under pressure in excess of that in the gas main. The present collar provides improvements by eliminating gas pockets which have heretofore formed when the sealant is introduced into the collar and also means for sealing leaks in gas mains carrying pressure on the order of 50 psi.

3 Claims, 5 Drawing Figures

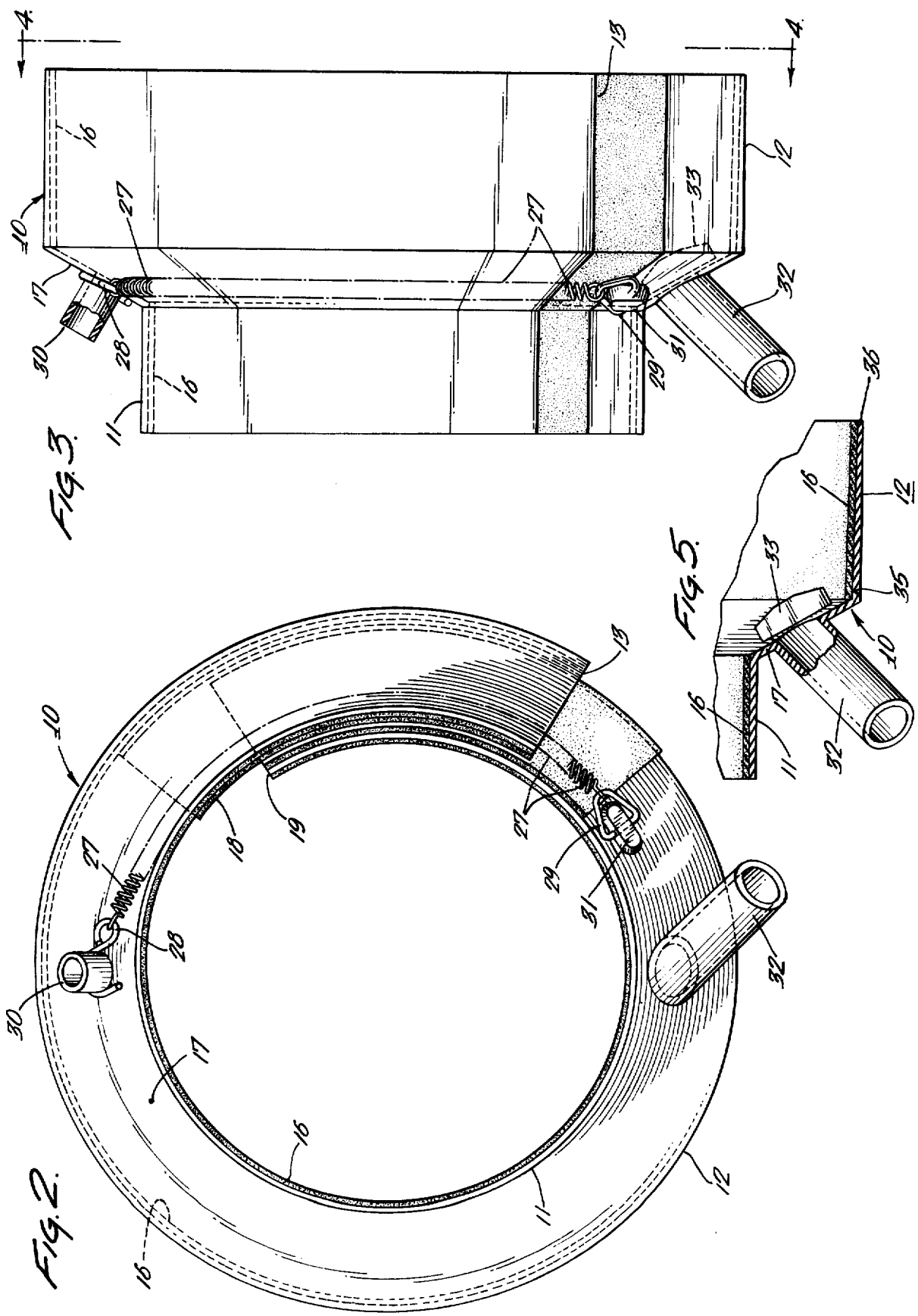

COLLAR FOR SEALING PIPE JOINTS

PRIOR ART AND BACKGROUND

The current apparatus and technology for sealing gas mains as briefly described above is well known as may be seen by reference to some or all of the following:

U.S. Pat. No. 3,141,478
U.S. Pat. No. 3,178,793
U.S. Pat. No. 3,228,146
U.S. Pat. No. 3,260,280
U.S. Pat. No. 3,265,782

Abandoned U.S. application of E. O. Hilbush Ser. No. 503,817 filed Oct. 23, 1965.

The sealing collars currently in use have proven to be unsatisfactory since they cannot withstand pressures greatly in excess of 3 psi in the gas mains. Also the sealant when forced through the inlet tube fails to flow evenly around the main, because one side or the other reaches the vent prematurely thus causing a gas pocket to be formed which thereby inhibits or prevents the proper sealing of the leaking joint.

OBJECTS OF THE INVENTION

It is therefore a primary object of the invention to provide means for preventing the formation of gas pockets during the filling of a sealing collar for an underground main.

A further object of the invention is to provide a dam for producing controlled direction of sealant flow in the collar while being filled.

A further object of the invention is to provide means in a sealing collar of the type described for producing turbulence in the sealant which permits the leaking gas to escape through the vent and to inhibit the formation of gas pockets in the sealant during its introduction into the collar.

A further object of the invention is to provide a tapered unitary molded collar which is reinforced in the area not directly clamped by the sealing bonds and which eliminates the heretofore experienced detachment of the holding spring element during installation of the collar. Further objects will be apparent from the specification and drawings.

Figure 4:
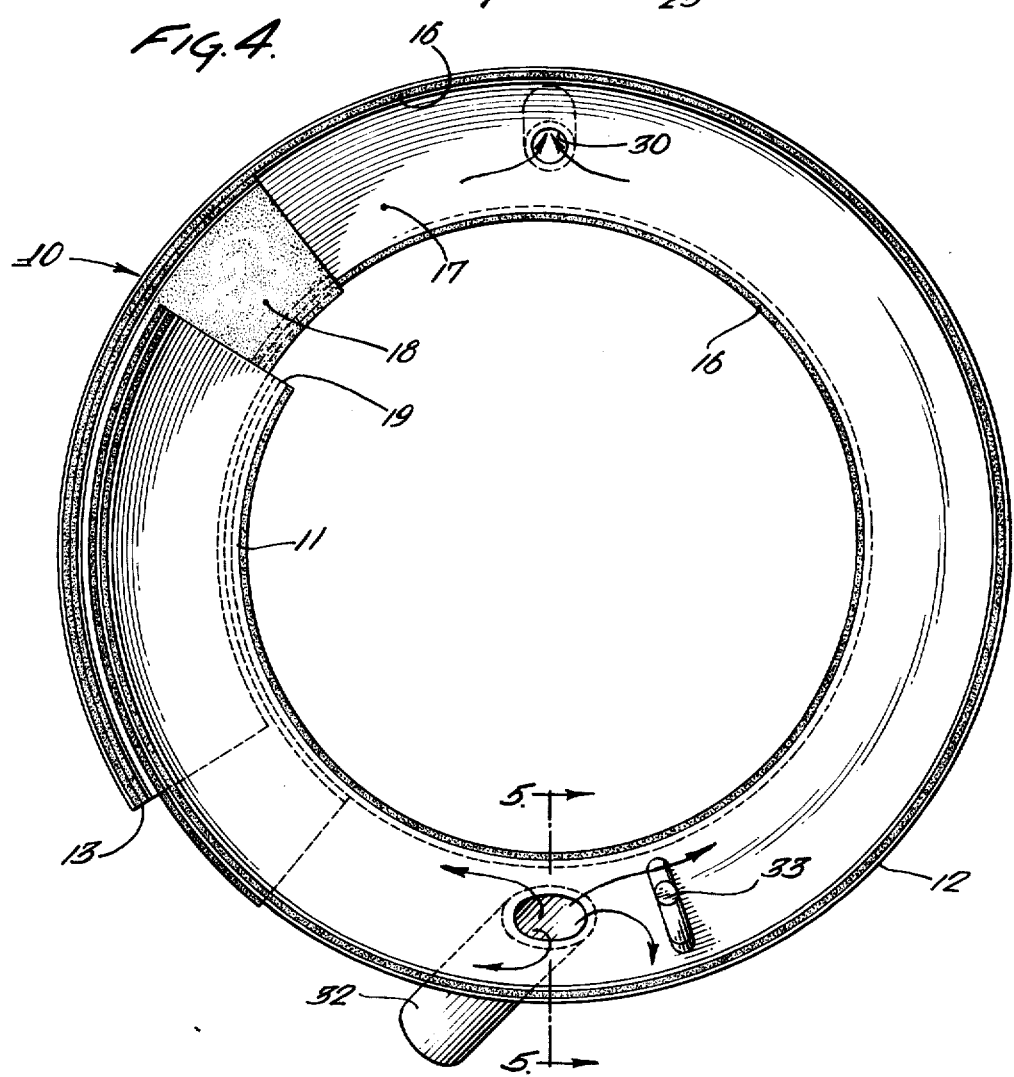

IN THE DRAWINGS,

FIG. 1 is a view partly sectioned of a sealed gas main bell and spigot joint indicating the fill or inlet tube on the bottom, and the vent tube on the top, FIG. 2 is an enlarged view of the sealing collar in an assembled condition as it would appear prior to the filling operation, FIG. 3 is a side view of the collar of FIG. 2, FIG. 4 is an opposite end view of the collar of FIGS. 2 and 3, and, FIG. 5 is an enlarged sectional detail as seen at 5—5 of FIG. 4.

Referring now more particularly to the drawings,

My improved collar for sealing underground gas mains under pressure in situ comprises a one piece molded, stepped collar element 10 having a small diameter sleeve 11 for the spigot, (FIG. 1) and a large diameter sleeve 12 for the bell. The collar, although one piece, is split as shown at 13 in FIG. 2 so that it may be installed by threading it around the bell 14 and spigot 15 of an underground gas main. The collar 10 may be molded to fit any diameter of bell and spigot joint and is provided with cellular sponge rubber strips 16, 16 adhered around the interior faces of sleeves 11 and 12. The interior sponge strips 16 are not carried across the connection frustoconical are 17 of the collar, but a flap of cellular sponge rubber 18 extends substantially beyond the terminus 19 of the overlapped end of the collar, and the flap 18 axially across and underneath inner strips 16, 16 and the connecting conical portion of the mold 17. Flap 18 is adhered to the exterior face of the overlapped end of the collar but is not carried completely around the collar it being only required that it have adequate adhesion. This location of the flap 18 prevents leakage by pressure sealing at the joint 13 from end to end across the entire mold.

As will be understood by reference to the prior art above a metallic band 25 is installed and tightened around the outside of the large diameter or bell sleeve of the collar and a similar band 26 is installed and tightened around the small or spigot sleeve of the collar. The cross-sectional configuration of the sleeve 12 is tapered to provide a reinforced or substantially strengthened area of the collar axially between the bands 25 and 26 including the frusto-conical portion 17. The taper in sleeve 12 increases towards its juncture with the conical portion 17. Also sleeve 11 may be tapered in like manner if desired to provide ample flexibility in large size collars.

Referring now to FIGS. 2 and 3, a spring 27 having a hook 28 secured to its free end and anchored at its opposite end by means of a triangular shaped loop 29 is secured over the vent tube 30 for the purpose of holding the collar in place while the bands 25 and 26 are being installed and tightened. The loop 29 to which the spring 27 is anchored is mounted in an integral rubber boss 31 which cannot be separated from the mold. Heretofore, it was found that the means for anchoring spring 27 was entirely unsatisfactory because despite various expedients, the anchoring device for the loop 29 frequently became detached thus requiring the collar to be removed and replaced. Otherwise an improper seal beneath bands 25 and 26 would result if not timely detected. The provision of the molded boss 31 of elongated configuration in the direction of stress imparted by spring 27 has been found to eliminate the above problem.

As shown in FIG. 1, the collar 10 is provided with an inlet tube or fitting 32 which is also integrally molded into the conical connecting area 17. It is important to bias the tube 32 in a manner shown in FIG. 2 to provide maximum clearance in the bore hole and to prevent kinks in the filling hose (not shown). As shown in FIG. 2, the filling tube 32 is biased to the right and consequently the sealant entering the collar is directed initially in a counter-clockwise direction as seen in FIG. 4. Regardless of the angle or direction in which tube 32 is biased, it has been found especially important to provide a baffle or dam 33 (FIG. 5) which controls and distributes the incoming sealant around both sides of the collar. As the sealant gradually fills from bottom to top, all of the gas escapes through the vent 30 so that no gas pockets are formed. In addition to controlling and equalizing the sealant flow around the inside of the collar as it is being filled, it is important that the sealant rising in clockwise direction as seen in FIG. 4 reach the joint 19 prior to any sealant reaching the joint 19 and the flap 18 which might find its way underneath the flap and destroy the effectiveness of the collar seal. An additional advantage of the dam is derived from the turbulence generated in the sealant as it fills the annulus inside the collar. This permits the release of any trapped gas in the sealant so that it can escape through vent 30.

The dam 33, as may be seen in FIG. 5, is also an integrally molded part of the collar 10 and like boss 31 is a part of the conical portion 17 of the collar but formed on the inside face thereof. The dam 33 may be bevelled as shown in FIG. 5 or rectangular but it is desirable that it extend substantially across the innerface of area 17 but at the same time permitting adequate passage for the controlled volume of sealant that is to be forced in a counter-clockwise direction as seen in FIG. 4.

Another important feature of my improved collar as noted above, resides in the tapered cross section of sleeves 11 and/or 12. As will be seen in FIG. 5, sleeve 12 is substantially thicker at the point designated 35 than at its outer edge 36. The increased thickness in the mold is continued through the conical area 17. This increased or strengthened area enables the collar to be used with pressures up to 50 psi without distorting or ballooning the area of the collar between bands 25 and 26. At the same time a total reinforcing would impede the satisfactory spreading of the collar around the gas main during installation because it must be twisted and threaded end to end through a narrow bore hole for this part of the installation procedure.

The above improvements have enabled a substantial reduction in the size of the bore hole necessary to install the collar and to introduce the sealant therein. In addition, where mains carry higher pressures it is now possible to utilize my improved collar for sealing leaks since the pressure under which the sealant is introduced must be in excess of the pressure in the main.

Having thus described by invention, I claim:

1. A molded flexible collar for sealing bell and spigot joints in pipes, said collar having a large sleeve to enclose the bell, a small sleeve to enclose the spigot, a connecting sleeve joining said large and small sleeves, the sleeves being integrally molded from an elastomeric material, a vent in said connecting sleeve for elimination of voids in the sealant by permitting gases to escape from the collar, a sealant inlet tube in said connecting sleeve circumferentially spaced from said vent, a dam secured to the inside of said connecting sleeve, said dam extending across the inside of said connecting sleeve and extending radially inward therefrom so that the top of said dam is spaced from the pipes to define a flow path between the pipes and said dam for the sealant to flow over said dam so that sealant flows in at least two circumferential directions about the collar with one direction of flow subject to a flow impediment caused by said dam, said inlet tube being circumferentially spaced from said dam and being connected to the collar so that sealant injected into the collar has a flow direction which is biased toward said dam.

2. The collar of claim 1, wherein said dam is integral with the collar.

3. The collar of claim 1, wherein said large and small sleeves each have one end forming a tip of the collar and said large and small sleeves each have a tapering cross section so that said large and small sleeves are each thicker at said collar tips than at the portion of the collar adjacent said connecting sleeve.

* * * * *